(12) United States Patent
O'Connor

(10) Patent No.: US 9,845,132 B2
(45) Date of Patent: Dec. 19, 2017

(54) MOUNTAIN BICYCLE WITH REAR SUSPENSION HAVING NEUTRAL BRAKING TRAJECTORY

(71) Applicant: INDUSTRIES RAD INC. {05011510}, Saint-Georges-de-Beauce (CA)

(72) Inventor: D'Arcy O'Connor, Burnaby (CA)

(73) Assignee: INDUSTRIES RAD INC., Saint-Georges-de-Beauce (CA)

( * ) Notice: Subject to any disclaimer, the term of this patent is extended or adjusted under 35 U.S.C. 154(b) by 70 days.

(21) Appl. No.: 14/736,962

(22) Filed: Jun. 11, 2015

(65) Prior Publication Data

US 2015/0360743 A1  Dec. 17, 2015

Related U.S. Application Data

(60) Provisional application No. 62/010,527, filed on Jun. 11, 2014.

(51) Int. Cl.
*B62K 25/26* (2006.01)
*B62K 25/28* (2006.01)

(52) U.S. Cl.
CPC ....... *B62K 25/286* (2013.01); *Y10T 29/49623* (2015.01)

(58) Field of Classification Search
CPC .................................................. B62K 25/286
USPC ..................... 280/281.1, 283, 284
See application file for complete search history.

(56) References Cited

U.S. PATENT DOCUMENTS

| | | | |
|---|---|---|---|
| 5,462,302 A | 10/1995 | Leitner | |
| 5,474,318 A | 12/1995 | Castellano | |
| 5,509,679 A | 4/1996 | Leitner | |
| 5,678,837 A | 10/1997 | Leitner | |
| 5,899,480 A | 5/1999 | Leitner | |
| 5,957,473 A | 9/1999 | Lawwill | |
| 6,843,494 B2* | 1/2005 | Lam | B62K 25/286 280/284 |
| 7,828,314 B2* | 11/2010 | Weagle | B60G 5/00 280/284 |
| 8,366,131 B2 | 2/2013 | O'Connor | |
| 9,145,185 B1* | 9/2015 | Claro | B62K 25/286 |
| 2006/0197306 A1* | 9/2006 | O'Connor | B62K 25/30 280/284 |
| 2008/0067772 A1* | 3/2008 | Weagle | B62K 25/286 280/124.134 |

(Continued)

*Primary Examiner* — Jacob Knutson
(74) *Attorney, Agent, or Firm* — Norton Rose Fulbright Canada LLP

(57) ABSTRACT

A rear wheel suspension system pivotably attached to a bicycle. The suspension system has an upper link attached to a main frame at a first pivot point, and a rear stay member attached to the upper link at a second pivot point. A lower link is attached to the main frame at a third pivot point, and is pivotably attached to the rear stay member at a fourth pivot point. A shock absorber is pivotably connected to the upper link and to the main frame. An instantaneous center of rotation (ICR) is defined where an upper axis extending through the first and second pivots intersects a lower axis extending through the third and fourth pivots. The ICR displaces along a trajectory from behind the bottom bracket, through an inflection point at which the upper axis and the lower axis are parallel, to in front of the bottom bracket, as the shock absorber compresses.

17 Claims, 10 Drawing Sheets

(56) References Cited

U.S. PATENT DOCUMENTS

2008/0303242 A1* 12/2008 O'Connor ............ B62K 25/286
　　　　　　　　　　　　　　　　　　　　　　280/284

* cited by examiner

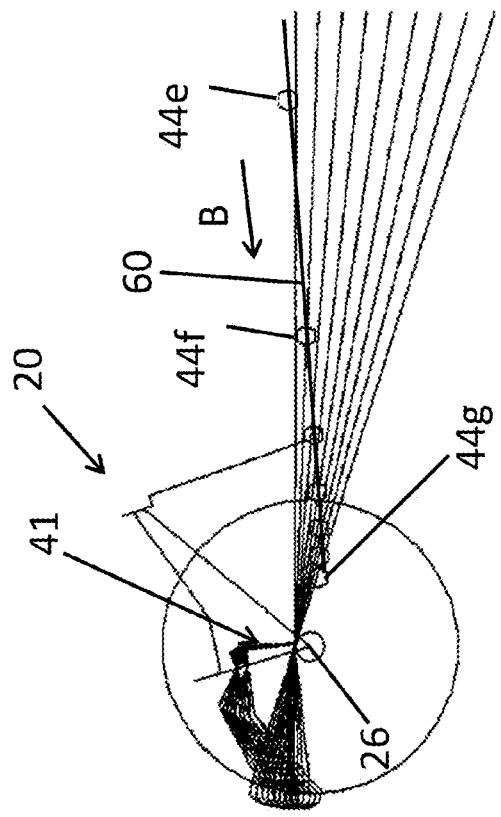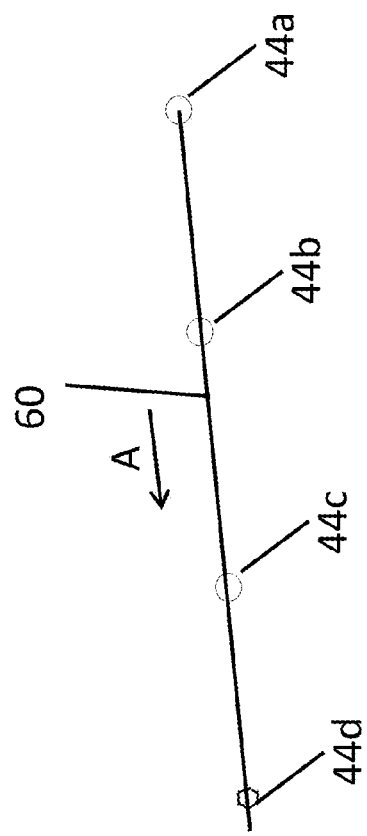
Fig. 7

MOUNTAIN BICYCLE WITH REAR SUSPENSION HAVING NEUTRAL BRAKING TRAJECTORY

CROSS-REFERENCE TO RELATED APPLICATIONS

The present application claims priority on U.S. Patent Application No. 62/010,527 filed Jun. 11, 2014, the entire contents of which is incorporated by reference herein.

TECHNICAL FIELD

The present invention relates generally to two-wheeled vehicles, particularly bicycles, and more specifically to a bicycle having a rear wheel suspension.

BACKGROUND

Rear wheel suspension systems have been used on a variety of two-wheeled vehicles, including motorcycles, scooters and pedal-powered bicycles, for providing improved rider comfort and increased performance.

Rear wheel suspensions on "mountain" bicycles have in fact become so common that they are now the norm rather than the exception. Such bicycle suspension systems improve ride quality by absorbing the energy incurred from encountering ground obstacles, rather than transmitting them through the frame to the rider. By maintaining greater contact between the tire and the ground, the suspension also provides the rider with better control for accelerating, braking, and cornering.

While a significant number of different rear wheel suspension designs already exist, constant improvement is sought such as to improve the efficiency of such suspension systems and/or to better tailor a specific suspension type and design for a given expected use of the bicycle in question. For example, most mountain bicycle suspensions which are specifically designed for downhill riding are quite different in composition and design than bicycle suspensions intended for cross-country riding.

SUMMARY OF THE INVENTION

In accordance with one aspect of the present invention, there is provided a bicycle, comprising: a main frame including at least a seat tube, a top tube, a head tube, a down tube, and a bottom bracket fixed to at least one of the seat tube and the down tube; and a rear wheel suspension system pivotably attached to the main frame, the rear wheel suspension system comprising: an upper link pivotably attached to the main frame at a first pivot point; a rear stay member having an upper end pivotably attached to the upper link at a second pivot point and a lower end having a dropout receiving a rear wheel axle of the bicycle; a lower link pivotably attached to the main frame at a third pivot point located on said main frame at a lower vertical elevation than the first pivot point, and the lower link being pivotably attached to the rear stay member at a fourth pivot point located on said rear stay member below said upper end thereof; and a shock absorber having a first end pivotably connected to the upper link and a second end pivotably connected to the main frame, the shock absorber operating between an uncompressed configuration and a fully compressed configuration; wherein an instantaneous center of rotation is defined at an intersection between an upper axis extending through the first and second pivots and a lower axis extending through the third and fourth pivots, the instantaneous center of rotation displacing along a trajectory as the shock absorber operates between the fully extended configuration and the fully compressed configuration, and wherein, as the shock absorber and thus the rear wheel suspension compresses from the fully extended configuration to the fully compressed configuration the instantaneous center of rotation displaces from a first position located rearward of the bottom bracket to a second position located in front of the bottom bracket, and wherein the instantaneous center of rotation travels through an inflection point between the first and second positions, the inflection point corresponding to a position where the upper axis and the lower axis are parallel to each other and the instantaneous center of rotation is defined at infinity.

There is also provided, in accordance with another aspect of the present invention, a rear wheel suspension system pivotably attachable to a main frame of a bicycle, the main frame having at least a seat tube, a top tube, a head tube, a down tube, and a bottom bracket fixed to at least one of the seat tube and the down tube, the rear wheel suspension system comprising: an upper link pivotably attachable to the main frame at a first pivot point; a rear stay member having an upper end pivotably attachable to the upper link at a second pivot point and a lower end having a dropout receiving a rear wheel axle of the bicycle; a lower link pivotably attachable to the main frame at a third pivot point located on said main frame at a lower vertical elevation than the first pivot point, and the lower link being pivotably attached to the rear stay member at a fourth pivot point located on said rear stay member below said upper end thereof; and a shock absorber having a first end pivotably connected to the upper link and a second end pivotably connectable to the main frame, the shock absorber operating between an extended configuration and a compressed configuration; wherein an instantaneous center of rotation is defined at an intersection between an upper axis extending through the first and second pivots and a lower axis extending through the third and fourth pivots, the instantaneous center of rotation displacing along a trajectory as the shock absorber operates between the extended configuration and the compressed configuration, and wherein as the shock absorber begins to compress from the extended configuration, the instantaneous center of rotation displaces from behind the bottom bracket, through an inflection point at which the upper axis and the lower axis are parallel, and to a location in front of the bottom bracket as the shock absorber continues to compress to the compressed configuration.

There is further provided, in accordance with another aspect of the present invention a method of making a bicycle having a main frame with a bottom bracket and a rear wheel suspension system including a rear stay member pivotably attached to the main frame by upper and lower link members and a shock absorber mounted between the main frame and the upper link member, the upper and lower link members each having a forward and a rearward pivot thereon and respectively defining an upper and lower link axis extending between each of the forward and rearward pivots, the method comprising: designing the rear wheel suspension system to have characteristics which remain throughout a travel distance of the shock absorber, said characteristics including an instantaneous center of rotation defined as a point at an intersection of the upper and lower link axes, the instantaneous center of rotation displacing along a trajectory as the shock absorber operates between an extended configuration and a compressed configuration, such that as the shock absorber begins to compress from the extended configuration, the instantaneous center of rotation displaces from behind the bottom bracket, through an inflection point at which the upper axis and the lower axis are parallel, and to a location in front of the bottom bracket as the shock absorber continues to compress to the compressed configuration; and assembling the rear wheel suspension system by pivotably mounting the upper and lower link members to the main frame and the rear stay member in a relative geometric relationship which provides said characteristics of the rear wheel suspension system.

BRIEF DESCRIPTION OF THE DRAWINGS

Reference will now be made to the accompanying drawings, in which:

FIG. 7 is a schematic view showing multiple instantaneous centers of rotation and their position with respect to a main frame of a bicycle, according to yet another embodiment;

DETAILED DESCRIPTION

Figure 1:
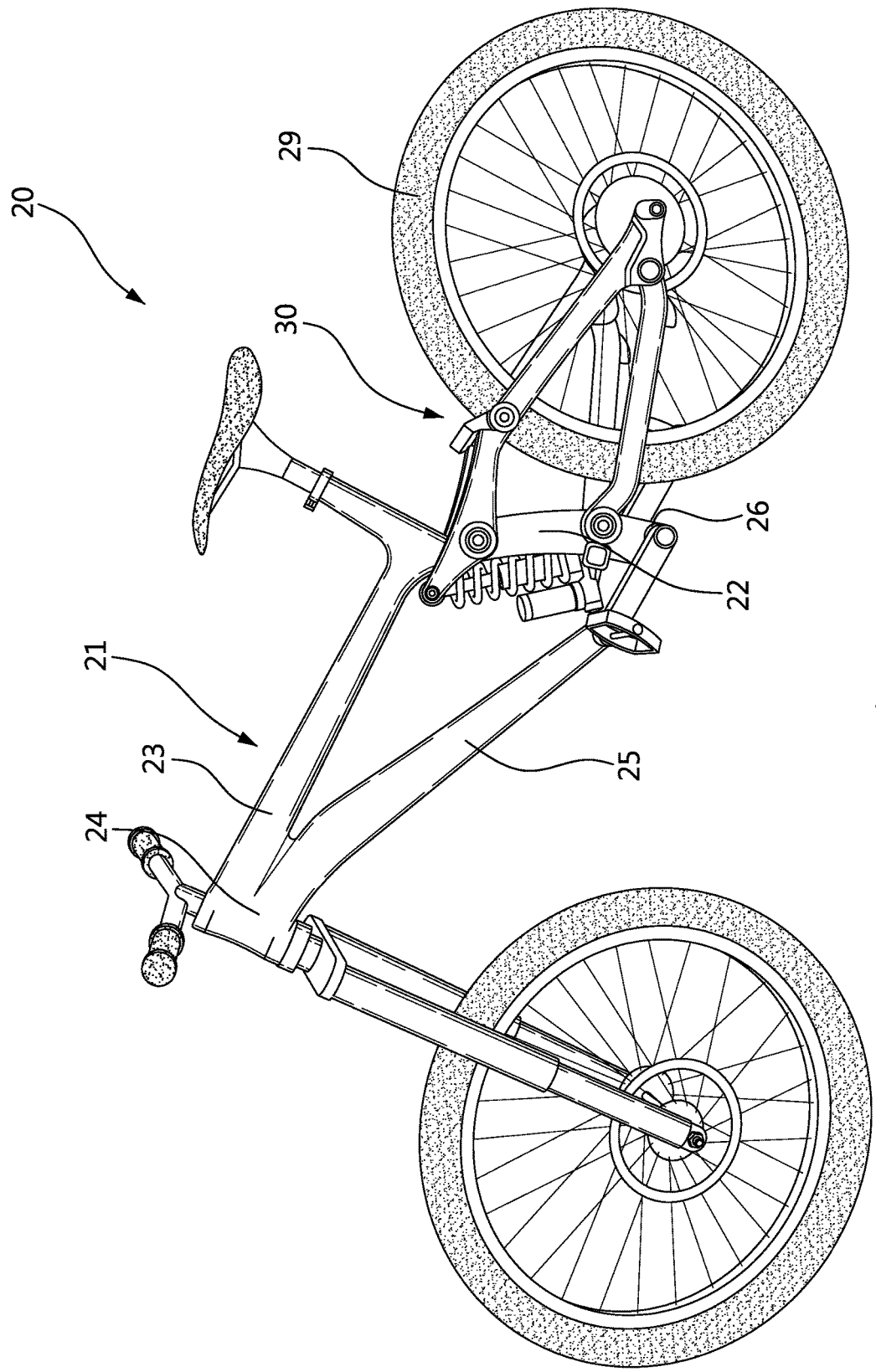
FIG. 1 is a perspective view of a downhill mountain bicycle including a rear wheel suspension system, according to an embodiment.

Referring to FIG. 1, a bicycle 20 according to an embodiment is generally shown. The bicycle 20 shown is one suitable for mountain bicycling, and more specifically, is particularly well adapted for downhill riding and racing. The bicycle 20 can of course be any other type of bicycle 20 where it is desired to improve ride quality by absorbing the energy incurred from encountering ground obstacles. The bicycle 20 includes a main frame 21 and a rear wheel suspension system 30 pivotably attached thereto, both of which will now be discussed in greater detail.

As used herein, the term "rear" designates a position which is towards the back of the bicycle 20, such as towards its rear wheel 29. Similarly, the term "front" designates a position which is forward of the rear position, such as towards the front wheel of the bicycle 20.

The main frame 21 constitutes the corpus of the bicycle 20 and provides the structural support thereto. The main frame 21 is formed of interconnected or integral components, which include a seat tube 22, a top tube 23, a head tube 24, and a down tube 25. While these components making up the main frame 21 are described herein as "tubes", it is understood that in an alternate embodiment they can also be non-tubular components. A bottom bracket 26 is located and fixed to the seat tube 22 or the down tube 25, or alternatively at the junction of both. The bottom bracket 26 receives the crank shaft, crank sprocket, and pedal cranks, all of which rotate about a crank axis extending through a center of the bottom bracket 26. In the embodiment shown, the seat tube 22 rigidly connects the bottom bracket 26 and the top tube 23. In an alternate embodiment, the seat tube 22 is of "partial length", i.e. rigidly suspended only from one of the tubes such as the top tube 23, for example. It will be appreciated that the main frame 21 can include additional or fewer components, if so desired, depending on the type of bicycle 20 or its intended application. In a particular embodiment, the main frame 20 is manufactured out of aluminum, steel, carbon-fiber, or any combination thereof.

In an alternate embodiment, the main frame 21 is a single structure rather than the aforementioned assembly of distinct tubes, such as a monocoque-type frame section which can be made for example of carbon fiber or sheet metal.

Figure 2:
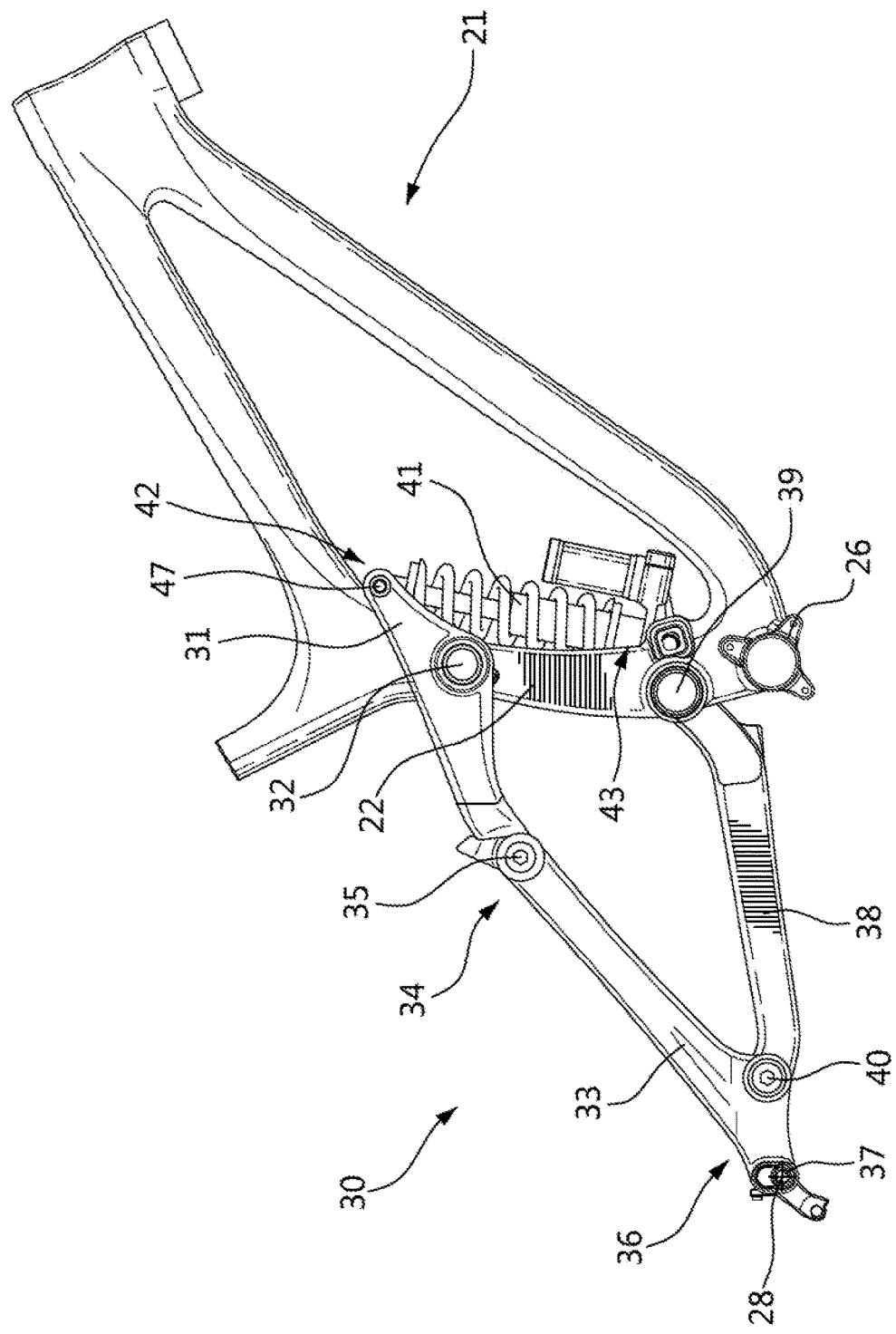
FIG. 2 is a schematic perspective view of a main frame of a bicycle, and of a rear wheel suspension system, according to another embodiment.

The rear wheel suspension system 30 (or simply "suspension system 30") is pivotably attached to a rearward portion of the main frame 21 so that it can pivot with respect thereto. More specifically, the suspension system 30 is fixedly attached to a rear wheel 29 of the bicycle 20, and pivotably attached to a rear of the main frame 21. As will be further discussed below, the suspension system 30 is pivotably attached at multiple points along the rearward end of the main frame 21, which allows the suspension system 30 to pivot relative to the main frame 21 about these points when the rear wheel 29 impacts a ground obstacle. In so doing, the suspension system 30 dampens, mitigates, or otherwise absorbs the energy of the impact, allowing for an improved riding performance of the bicycle 20. Referring to FIG. 2, the suspension system 30 generally takes the form of a multi-bar linkage, and includes an upper link 31, a rear stay member 33, a lower link 38, and a shock absorber 41. The relative geometrical relationship between the upper link 31, the rear stay member 33, and the lower link 38, define an instantaneous center of rotation 44 about which the suspension system 30 rotates. All of these features are now discussed in greater detail.

The upper link 31 is one component of the three-bar assembly of links which forms the structure of the suspension system 30 (the front bar of the resulting four-bar assembly so formed is provided by the main frame 21). The upper link 31 forms three pivot points with its pivotably interconnected components. At a forward end of the upper link 31, a pivot point 47 is formed where the upper link 31 attaches to a first end 42 of the shock absorber 41. The pivot point 47 helps to transmit the rotational movement of the suspension system 30 to the shock absorber 41, so that it can compress and extend as required to dampen the movement of the rear wheel 29. An intermediate portion (but not necessarily a mid-point) of the upper link 31 is attached to the main frame 21 at pivot point 32, such as on the seat tube 22, so that the upper link 31 can pivot with respect to the main frame 21. The point of attachment of the upper link 31 to the main frame 21 is designated the first pivot point 32. Finally, a rear end of the upper link 31 is pivotably attached to the rear stay member 33. The first pivot point 32 is the highest of the pivot points (i.e. furthest away from a ground surface when the bicycle 20 is upright) at which the suspension system 30 is attached to the main frame 21. If required, the upper link 31 can have two upper links 31, each pivotably attached to opposite sides of the seat tube 22, and joined by a yoke so as to reduce significantly the potential of the upper links 31 to twist relative to each other.

The rear stay member 33 is another component in the linkage forming the suspensions system 30, and links the upper link 31 to the rear wheel 29 of the bicycle 20. The rear stay member 33 has an upper end 34, and an opposed lower end 36. The terms "upper" and "lower" refer to the distance of the ends 34,36 relative to the ground surface when the bicycle 20 is upright, in that the upper end 34 is positioned furthest away from the ground surface.

The upper end 34 is pivotably attached to the upper link 31 so that both the upper link 31 and the rear stay member 33 can pivot with respect to one another. The upper end 34 therefore forms a second pivot point 35 where it attaches to the upper link 31. At its lower end 36, the rear stay member 33 has a dropout 37 which receives a rear wheel axle 27 of the rear wheel 29 of the bicycle 20. When mounted to the dropout 37, the rear wheel 29 rotates about a rear wheel axis 28 defined along the centerline of the rear wheel axle 27. It can thus be appreciated that the mounting of the rear stay member 33 described herein allows the rear stay member 33 to transfer at least some of the energy of the impact of the ground obstacles against the rear wheel 29 to the upper link 31, and ultimately, to the shock absorber 41.

The lower link 38 forms another component of the linkage forming the suspension system 30. At its forward end, the lower link 38 is attached to the main frame 21 (typically the seat tube 22) so that the lower link 28, and thus the rear wheel 29, can pivot with respect to the main frame 21. As such, the attachment of this forward end of the lower link 38 to the main frame 21 forms another pivot point, designated as the third pivot point 39. The third pivot point 39 is located on the main frame 21 at a lower vertical elevation (i.e. closer to the ground surface when the bicycle 20 is upright) than the first pivot point 32. The third pivot point 39 is located proximate to, but above, the bottom bracket 26, and thus, proximate to, and above, the crank axis. The third pivot point 39 can be vertically aligned with the first pivot point 32, or offset forwardly or rearward offset therefrom. In the depicted embodiment, the lower third pivot point 39 is located rearward of the bottom bracket crank axis, while the upper first pivot point 32 is substantially aligned with the bottom bracket crank axis.

At its rearward end, the lower link 38 is attached to the rear stay member 33 so that the lower link 38 and the rear stay member 33 can pivot with respect to one another. As such, the attachment of this end of the lower link 38 to the rear stay member 33 forms another pivot point, designated as the fourth pivot point 40. The fourth pivot point 40 is located on the rear stay member 33 near, but not necessarily at, its lower end 36, proximate to the dropout 37. As such, the fourth pivot point 40 is located below (i.e. closer to the ground surface) the upper end 34 of the rear stay member 33. If desired, the fourth pivot point 40 can be located away from the extremities of the rear stay member 33. For example, it can located on the rear stay member 33 between the upper and lower ends 34,36. More specifically, the fourth pivot point 40 can be located proximate the lower end 36 of the rear stay member 33 at a point thereon disposed above the rear wheel axis 28.

The shock absorber 41, which can be a springing and damping mechanism, is pivotably attached to both the main frame 21 and the upper link 31. Specifically, at its upper, first end 42, the shock absorber 41 is pivotably attached or connected to the upper link 31 at pivot point 47 so that both the shock absorber 41 and the upper link 31 can pivot with respect to one another. At its lower, second end 43, the shock absorber 41 is pivotably attached or connected to the main frame 21 so that it can pivot with respect thereto. As such, a lower shock mounting bracket can be provided to pivotably attach the shock absorber 41 to the main frame 21. In the embodiment shown, the lower shock mounting bracket is secured to the main frame 20 along the seat tube 22, such as by welding or brazing. The shock absorber 41 can alternately be mounted with equal effect elsewhere within the main frame 21 by attaching it to one or more of the other tubes, or outside the main frame 21, such as between the upper link 31 and the seat tube 22, for example.

The shock absorber 41 operates between a fully extended configuration and a fully compressed configuration. As it travels towards the compressed configuration, the shock absorber 41 provides a compression resistance force against which the suspension system 30 operates. This compression resistance force is more easily understood with reference to the springing and damping mechanism embodiment shown in FIG. 2. As the rear wheel 29 encounters ground obstacles, the suspension system 30 will rotate in a clockwise direction. This will cause the upper link 31 to pivot in a clockwise direction as well such that the upper link 31 applies a compression to the first end 42 of the shock absorber 41. The compression applied by the upper link 31 is resisted by the spring of the shock absorber, which generates the reactionary compression resistance force. It will be appreciated that the compression resistance force can be generated by hydraulic, pneumatic, elastomeric, or other mechanical means.

It can therefore be appreciated that the shock absorber 41 acts to counter any forces that may be applied to the suspension system 30 by the rear wheel 29 so as to tend to maintain the relative positions of the main frame 21 and the suspension system 30 constant. Doing so thereby also tends to attempt to keep the rear wheel 29 in substantially continuous contact with the ground thereby affording the rider greater control of the bicycle 20 than would occur if the rear wheel 29 is permitted to leave contact with the ground for significant periods of time. Having the rear wheel 29 out of ground contact results in a significant decrease in the rider's ability to exert control over the bicycle 20. By doing so, the shock absorber 41 absorbs much of the energy which enters the bicycle 20 through the rear wheel 29 rather than having that energy transferred through the main frame 21 to the rider. As a result the rider experiences a more comfortable ride and is able to maintain better control over the bicycle 20. This is of particular significance when the bicycle 20 is operated over highly uneven terrain such as takes place in the operation of mountain bicycles.

Devices can be provided for permitting the rider to be able to adjust the suspension system 30 in order to adapt the suspension system 30 to variations in the terrain over which the bicycle 20 is being operated, i.e. to restrict the length of the rear wheel travel for smooth terrain riding and allow for a maximum rear wheel travel for rougher terrain riding, with optionally one or more intermediate positions in between. Such devices can include a bolt or removable locking or quick release pin received in one of several holes, a crank controlling a rack and pinion arrangement, or a spring biased detent pin and track, to name but a few examples.

Figure 3:
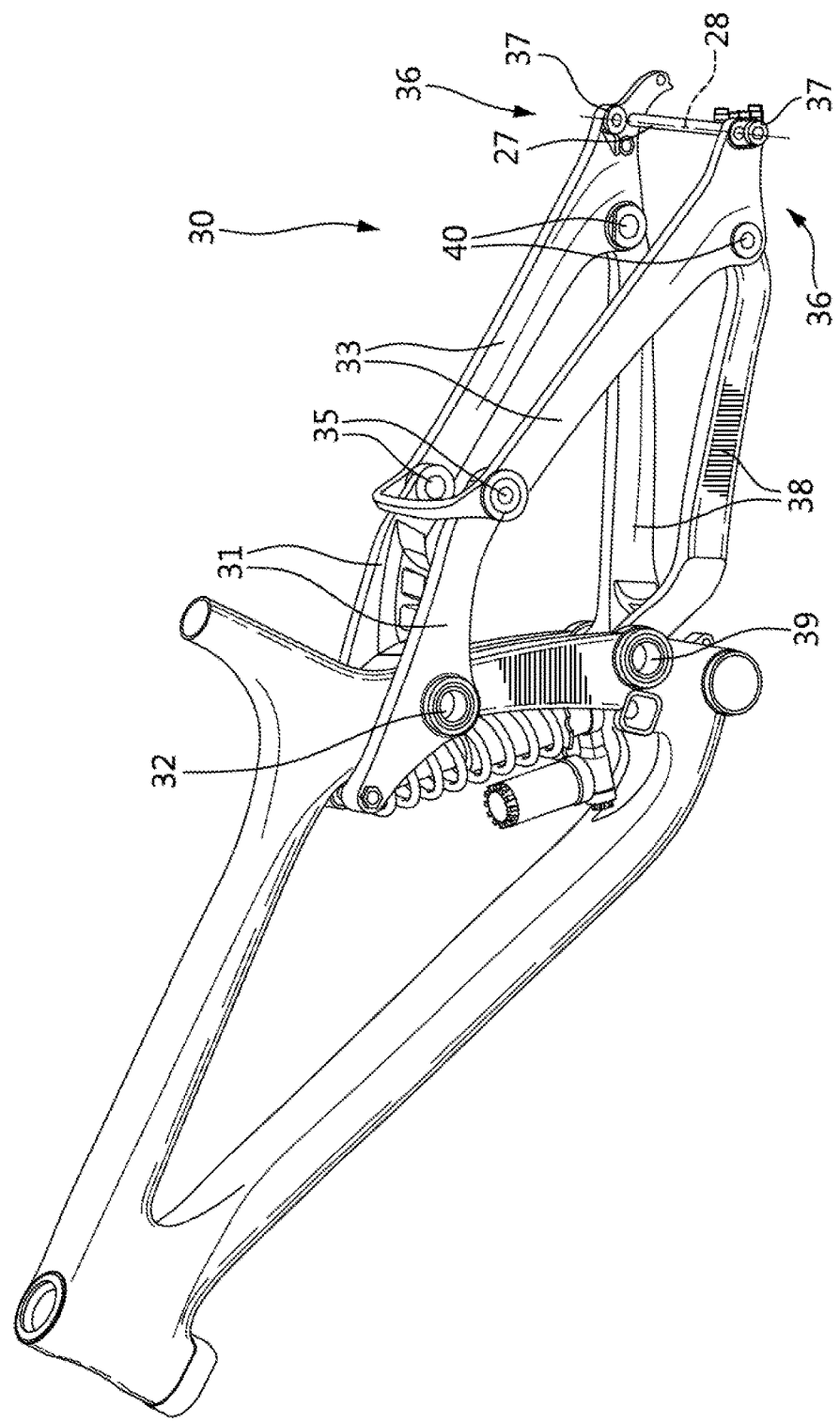
FIG. 3 is a perspective view of the main frame and the rear wheel suspension system shown in FIG. 2.

As can be seen in FIG. 3, one or more of the upper link 31, rear stay member 33, and lower link 38 can include pairs of the same. Each upper link 31, rear stay member 33, and lower link 38 can therefore be disposed on opposite sides of the rear wheel axle 27 and the rear wheel 29. For example, the rear wheel 29 of the bicycle 20 can be mounted between the pair of rear stay members 33 at dropouts 37 provided at the lower ends 36 thereof. Hence, the rear wheel axle 27, and, therefore, the rear wheel axis 28, is mounted within the dropouts 37. Each of the upper links 31, rear stay members 33, and lower links 38 are preferably formed so as to be joined by a yoke to its counterpart member. As such, any potential that might otherwise occur for the counterpart members to twist vis-à-vis each other is thereby reduced significantly.

In most embodiments, but not necessarily all, the effective length of the lower links 38 and the rear stay members 33 (i.e. the distance between third and fourth pivot points 39,40, and the distance between second and fourth pivot points 35,40) is greater than is the effective length of the upper links 31 (i.e. the distance between the first and second pivot points 32,35).

The relative geometric relationship of the upper link 31, the rear stay member 33, and the lower link 38 define an instantaneous center of rotation (or simply "ICR") of the rear wheel 29, and thus of the suspension system 30. The ICR marks the point about which the suspension system 30 rotates at any given moment. It can thus be referred to as a virtual pivot point, or VPP. The ICR is determined from the positions of the upper link 31, the rear stay member 33, and the lower link 38 at any given moment, defining a plurality of different ICRs within the range of travel of the suspension system 30. Collectively, these multiple ICRs form a trajectory defining the displacement of the ICR through space as a function of the movement of the rear wheel 29.

Figure 4:
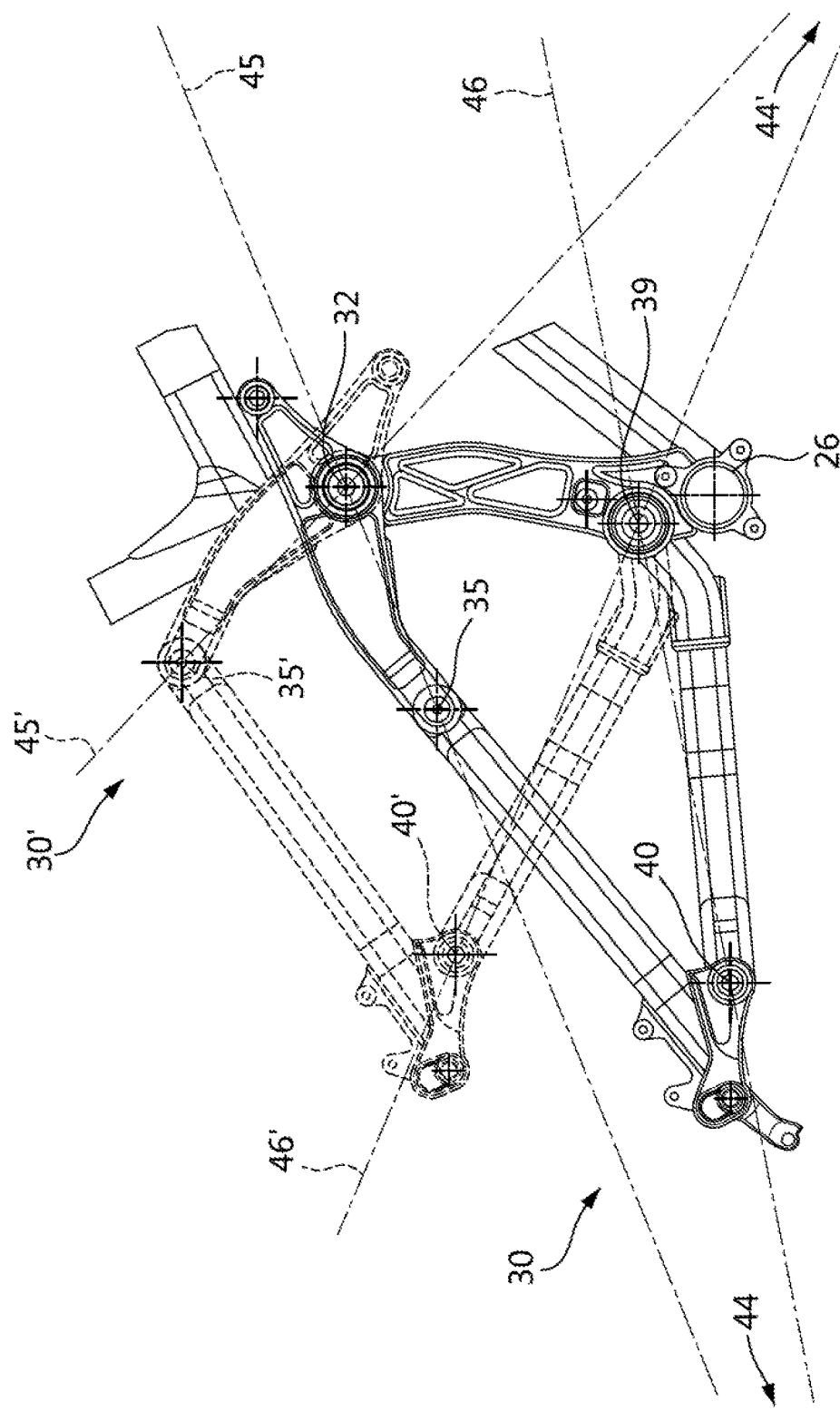
FIG. 4 is a schematic side view showing two positions of the rear wheel suspension system of FIG. 2 each having an instantaneous center of rotation.

Referring to FIG. 4, the ICR 44 of the suspension system 30 is defined at the intersection of an upper axis 45 extending through the first and second pivots 32,35 with a lower axis 46 extending through the third and fourth pivots 39,40. In FIG. 4, the upper and lower axes 45,46 converge somewhere off the page to the rear of the bottom bracket 26, and thus the actual point of intersection which defines the ICR 44 cannot be seen. FIG. 4 also shows the position of the suspension system 30' after the rear wheel 29 has encountered a ground obstacle. The ICR 44' of the suspension system 30' is defined at the intersection of the upper axis 45', which extends through the first and second pivots 32,35', with a lower axis 46' extending through the third and fourth pivots 39,40'. The upper and lower axes 45',46' converge somewhere off the page to the front of the bottom bracket 26, and thus the actual point of intersection which defines the ICR 44' cannot be seen.

It can thus be appreciated from FIG. 4 that the ICR 44 is displaced along the trajectory when the shock absorber 41 travels between its extended and its compressed configurations. More specifically, the ICR 44 displaces along its trajectory, beginning from a position located behind the bottom bracket 26 as the shock absorber 41 begins to compress from the fully extended configuration, extending through an inflection point at which the upper axis 45 and the lower axis 46 are parallel, to a position in front of the bottom bracket 26 as the shock absorber 41 continues to compress to the fully compressed configuration. The ICR 44 is therefore located behind the bottom bracket 26 when the suspension system 30 is disposed in the fully extended configuration and its neutral position, and is located forward of the bottom bracket 26 when the suspension system 30 is fully compressed.

This is better appreciated when considering that the trajectory includes an infinite number of points, all of which are disposed either behind the bottom bracket 26 (i.e. away from the bottom bracket 26 in a direction toward the rear wheel 29), in front of the bottom bracket (i.e. away from the bottom bracket 26 in a direction toward the front wheel), or at a point (which may be an inflection point) where the ICR 44 is defined at infinity. This point (where the ICR 44 extends to infinity) represents a transition in the trajectory of the ICR 44 because it marks the point on the trajectory before which the ICRs 44 are located behind the bottom bracket 26, and after which the ICRs are located in front of the bottom bracket 26. It can thus be appreciated that the ICR 44 is displaced or travels between the front and rear of the bicycle 20.

Figure 5:
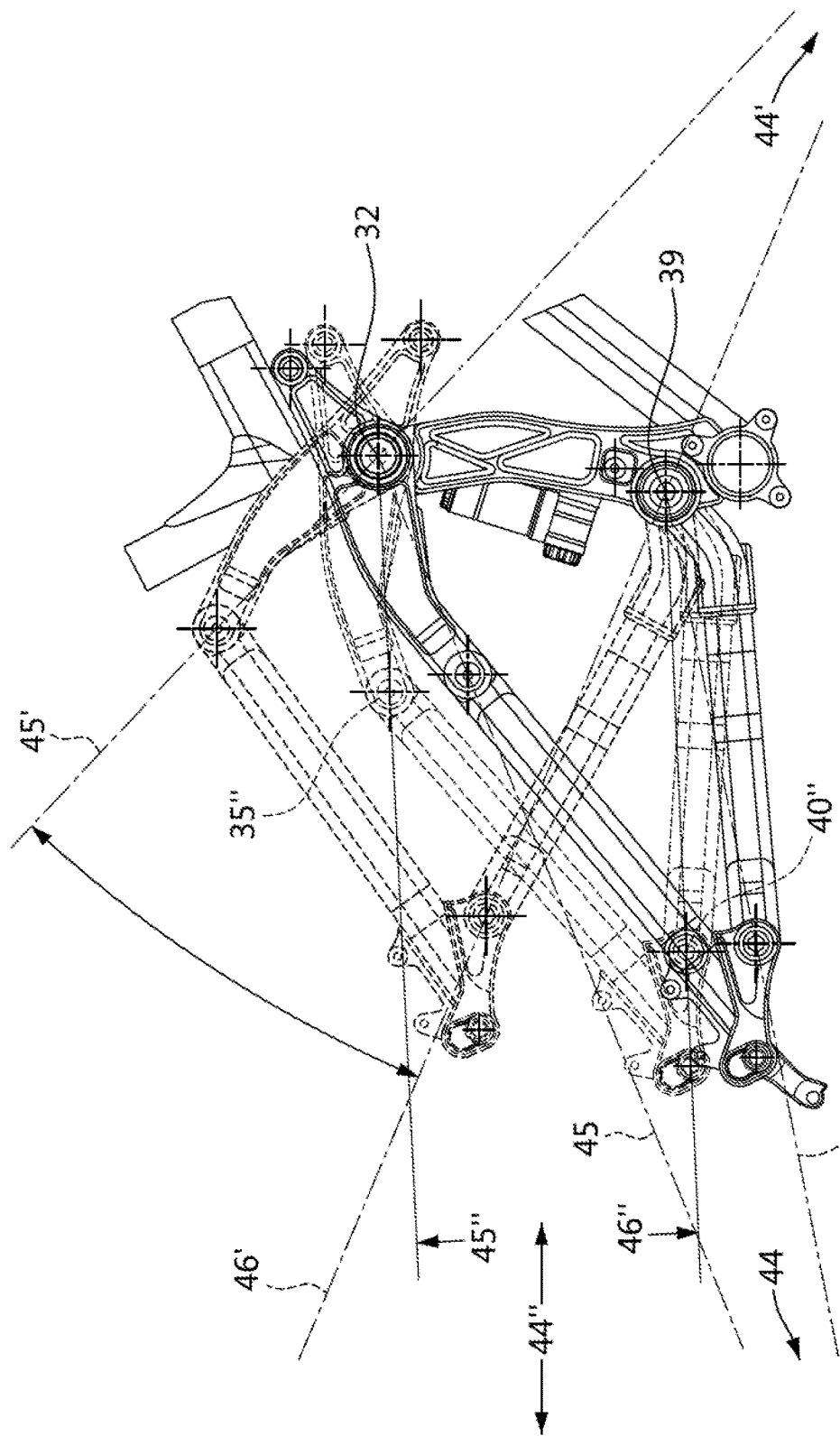
FIG. 5 is a schematic side view showing three positions of the rear wheel suspension system of FIG. 2 each having an instantaneous center of rotation.

FIG. 5 provides examples of three ICRs 44, each lying along a different segment of the trajectory followed by the ICR 44. The first ICR 44 shown in FIG. 5 is similar to the ICR 44 of FIG. 4, in that it is defined at the intersection of the upper axis 45 with the lower axis 46. The ICR 44 forms somewhere off the page to the rear of the bottom bracket 26, and thus cannot be seen. The second ICR 44' shown in FIG. 5 is similar to the ICR 44' of FIG. 4, in that it is defined at the intersection of the upper axis 45' with the lower axis 46'. The ICR 44' forms somewhere off the page to the front of the bottom bracket 26, and thus cannot be seen. The third ICR 44" shown in FIG. 5 is defined at the intersection of the upper axis 45", which extends through the first and second pivots 32,35", with a lower axis 46" extending through the third and fourth pivots 39,40". Since the upper and lower axes 45",46" are parallel, the ICR 44" forms at the point of intersection of these lines at infinity. The slope of the ICR curve when it goes through infinity remains constant and non-zero. Accordingly, the trajectory of the ICR 44 continues on the same path on either side of the bottom bracket, and accordingly goes through infinity.

Figure 6:
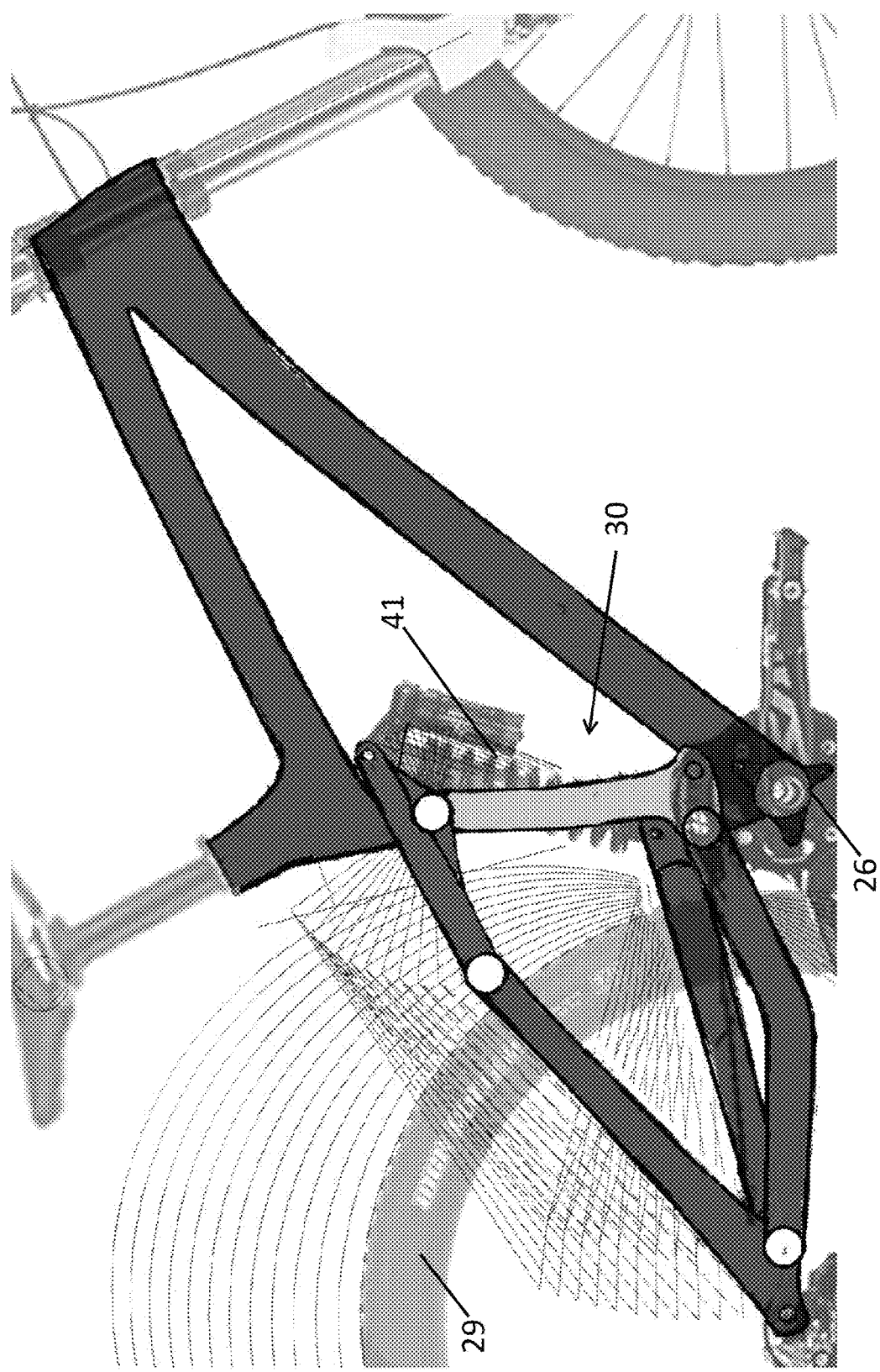
FIG. 6 is a schematic side view showing representations of the positions of the rear wheel suspension system of FIG. 2 as it rotates about corresponding instantaneous centers of rotation.

FIG. 6 schematically shows the position of the rear wheel 29 and the suspension system 30 at various positions that the rear wheel 29 may occupy. Most, but not all, of the positions shown would define an ICR 44 positioned in front of the bottom bracket 26.

FIG. 7 provides more examples of the position of the ICR 44 with respect to the bottom bracket 26, and is demonstrative of the correlation between the travel distance of the shock absorber 41 and the movement of the ICR 44 along its trajectory 60. More specifically, as the shock absorber 41 starts to compress from its extended configuration, the ICR 44 moves along the trajectory 60 away from the bottom bracket 26 towards the rear of the bicycle 20 before reaching the inflection point, at which point the ICR 44 tends to infinity.

This direction away from the bottom bracket 26 is exemplified in FIG. 7 by arrow A. As can be seen, ICR 44a corresponds to the position of the shock absorber 41 when it is in the fully extended configuration. As the shock absorber 41 begins to compress, the ICR 44 moves rearward away from the bottom bracket 26 through ICRs 44b,44c, 44d.

After passing through the inflection point, the ICRs 44 move along the trajectory toward the bottom bracket 26 as the shock absorber 41 continues to compress. This direction is exemplified in FIG. 7 by arrow B. As the shock absorber 41 continues to compress and until the moment when it is in the fully compressed configuration, the ICR 44 will continue to advance along the trajectory 60 towards the bottom bracket 26 and pass through ICRs 44e,44f,44g.

In some embodiments, the ICRs 44 lying along the positions behind the bottom bracket 26 correspond to a percentage of the travel distance of the shock absorber 41 from the extended configuration. The travel distance is understood to be the stroke of the shock absorber 41. In the embodiment of the shock absorber 41 shown in FIG. 6, the travel distance is the total distance covered by the displacement of the spring as it is compressed from its extended configuration to its compressed configuration. With such a shock absorber 41, the ICRs 44 displace through the plurality of positions behind the bottom bracket of the trajectory when the shock absorber 41 travels between about 30% to about 40% of the travel distance.

Figure 8:
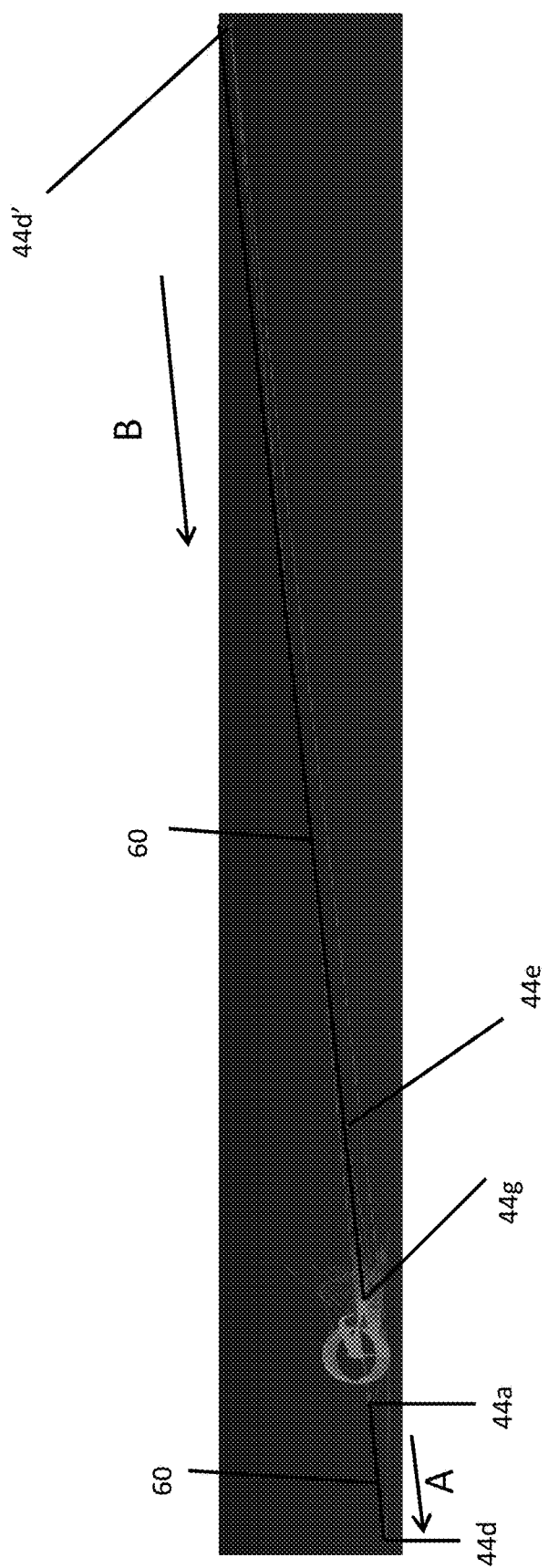
FIG. 8 is another schematic view showing multiple instantaneous centers of rotation and their position with respect to the suspension system positions of the bicycle.

FIG. 8 shows the entirety of the trajectory 60 of the ICRs 44 of FIG. 7. As can explained above, as the shock absorber of the rear suspension 30 starts to compress from its extended configuration, the ICR 44 moves along the rear trajectory 60 in direction A, away from the bottom bracket of the frame towards the rear of the bicycle 20 before reaching the inflection point, following point ICR point 44d, at which point the ICR 44 tends to infinity. ICR 44a corresponds to the position of the shock absorber 41 when it is in the fully extended configuration. As the shock absorber 41 begins to compress, the ICR 44 moves rearward away from the bottom bracket 26 through to ICR 44d.

After passing through the inflection point at infinity, the ICR 44 move along the forward trajectory 60 in direction B, from the ICR point 44d' toward the bottom bracket 26, as the shock absorber 41 continues to compress. As the shock absorber 41 continues to compress and until the moment when it is in the fully compressed configuration, the ICR 44 will continue to advance along the forward trajectory 60 towards the bottom bracket 26 and ICR 44g.

Figure 9:
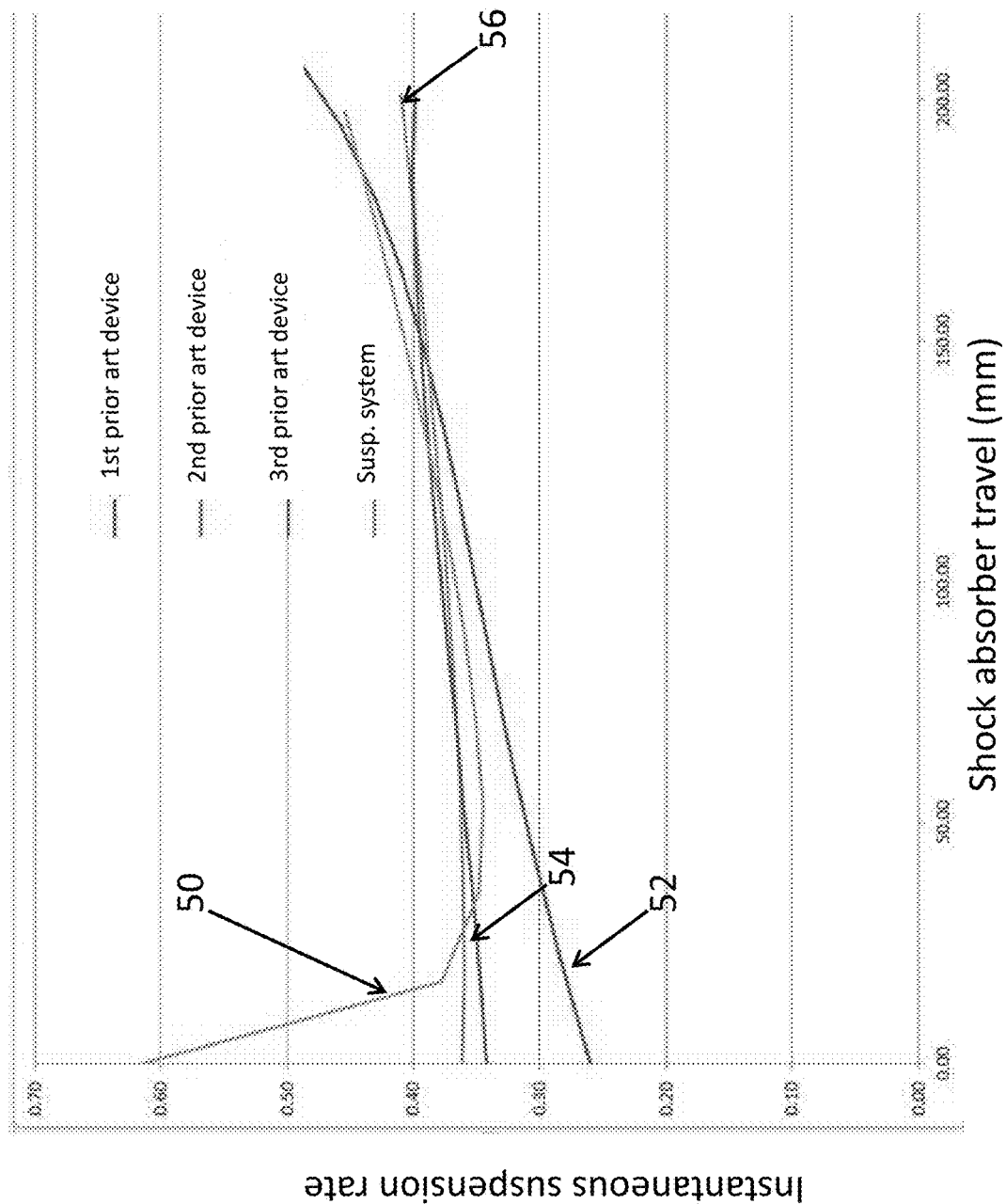
FIG. 9 is a graphical representation of an instantaneous suspension rate as a function of the travel distance of a shock absorber for a suspension system such as shown in FIG. 1.

The relationship between the trajectory followed by the ICRs 44 through space and the travel distance of the shock absorber 41 is further appreciated from FIG. 9. Referring to FIG. 9, an instantaneous suspension rate as a function of the travel distance of the shock absorber 41 is graphically shown. As can be seen, the suspension rate curve 50 of the suspension system 30 decreases relatively significantly over a first portion of the travel distance of the shock absorber 41. The first portion is approximately 15% of the total travel distance. The decrease in the suspension rate along the first portion of the travel distance generally corresponds to the displacement of the ICR 44 through the segment of its trajectory lying behind the bottom bracket 26. Following this initial drop in the suspension rate, the suspension rate increases for the remaining portion of the travel distance after the first portion. The increase in the suspension rate along the remaining portion of the travel distance generally corresponds to the displacement of the ICR 44 through the segment of its trajectory lying in front of the bottom bracket 26. The movement of the ICR 44 in front of the bottom bracket 26 may encourage wheel wrap around the bottom bracket 26, and help to minimize chainstay lengthening.

Having the ICR 44 behind the bottom bracket 26 for the first portion of the travel distance can provide for a significant counter, or opposite, rotation of the rear stay member 33 with respect to the direction of rotation of the suspension system 30, such that the overall forward rotation of the rear stay member 33 is about 3°. In contrast, the overall forward rotation of the rear stay member of a known single pivot swing arm suspension has been measured to be about 33°. This difference in the rotation of the rear stay member 33 can allow the rear stay member 33, to which the rear wheel bracket is attached, to act as a floating brake caliper, and thus contributes to reduce or substantially eliminate "brake jacking".

As can be seen in FIG. 9, the suspension rate curves 52,54,56 for the prior art suspension systems do not appear to exhibit such an initial decrease in the suspension rate. Indeed, most prior bicycle suspensions are referred to as "rising rate" suspensions because the suspension rate increases along the travel distance of the shock absorber. Thus, the rear wheel of such known systems will move significantly for the first portions of the travel distance, and less as the compression applied by the system is increased incrementally. In contrast, the suspension system 30 disclosed herein applies an initial relatively large compression force such that the rear wheel axle 27, and thus the rear wheel 29, moves a comparatively small distance at first and enables the first portion of travel of the rear wheel 29 to be relatively stiffer.

Figure 10:
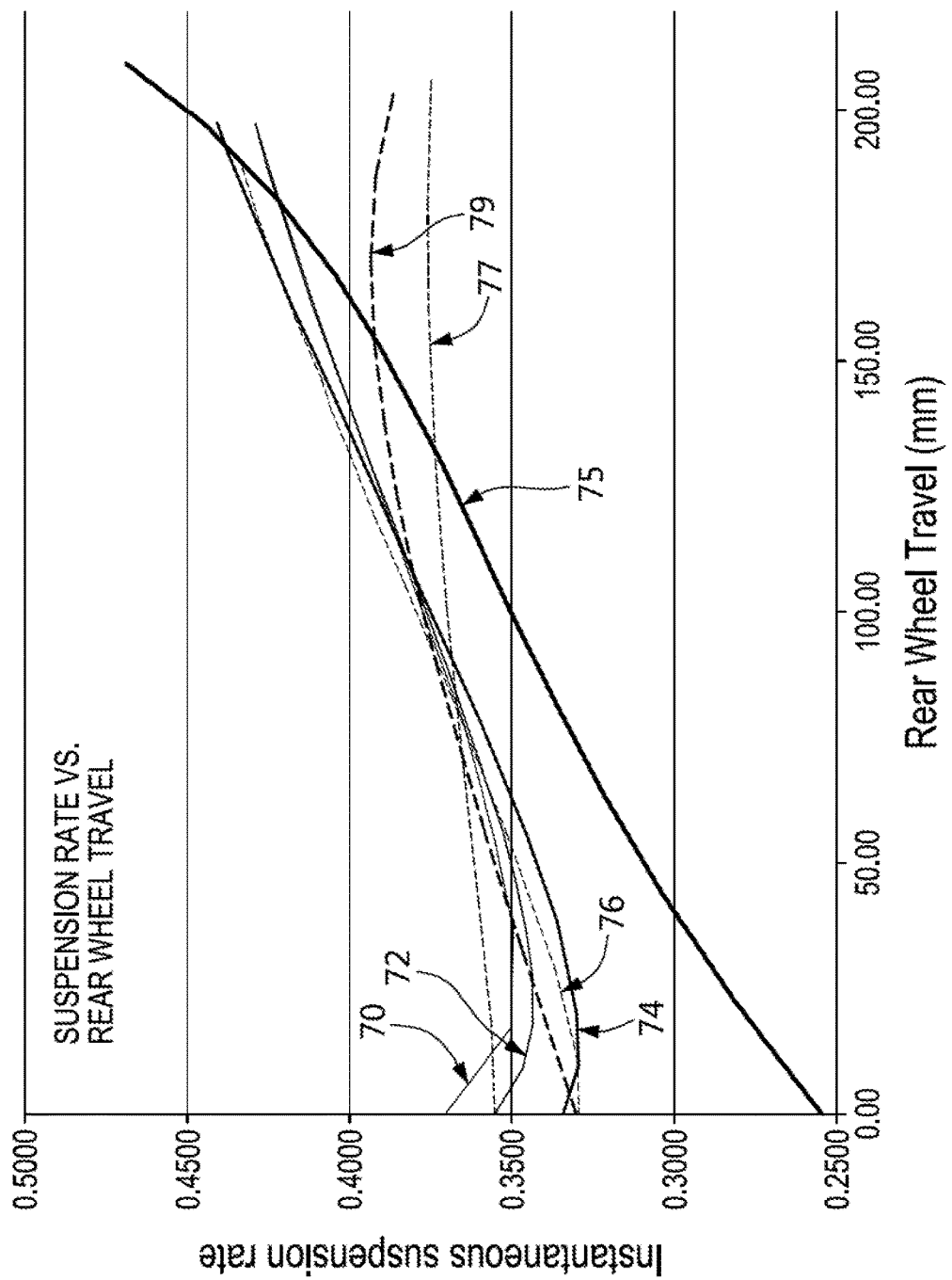
FIG. 10 is a graph showing instantaneous suspension rate as a function of the rear wheel travel distance for the suspension system shown in FIG. 1.

FIG. 10 graphically depicts the instantaneous suspension rate (or "RATE") on the Y-axis as a function of the rear wheel travel (or "RWT", in mm) on the X-axis, for four different embodiments of the presently described suspension system 30, depicted by curve lines 70, 72, 74 and 76. As can be seen, the suspension rate curves 70, 72, 74 and 76 of these four embodiments of the suspension system 30 decrease initially over a first portion (e.g. less than 25 mm of travel) of the travel distance of the rear wheel. One may compare this initial decrease in rate to the three rate curves 75, 77 and 79 of known prior art suspension designs, which increase continually from the very beginning of travel of the rear wheel.

This initial decrease in the suspension rate is believed to be the result of the ICR 44 moving "through infinity" (i.e. through the inflection point) as the shock absorber 41 compresses. As noted above, the slope of the ICR curve when it goes through infinity remains constant and non-zero, and therefore the trajectory of the ICR 44 continues on the same path on either side of the bottom bracket and moves through infinity without passing through an inflection point on the curve. Such a change in the suspension rate may "wind up" or preload the spring of the shock absorber 41, thereby allowing the bicycle 20 to be ridden higher and with a lighter spring, which can provide significant advantages to the rider. This initial drop in the suspension rate may also allow for greater rear wheel 29 "bite" when the un-weighted suspension system 30 is beginning to regain traction with the ground surface and the brakes are engaged.

The suspension described herein is not significantly affected by rear brake actuation. This is because the virtual swingarm length is short, and the braking force at the caliper applies a negative moment to the un-sprung mass, causing it to extend with impulse application of rear brake (or "popping" the brake). The present suspension system places the ICR further away from the rear axle at the starting point of the ICR trajectory, thus making the virtual swingarm significantly longer, and a negligible effect on suspension extension because the braking impulse moment is applied to a very long lever (swingarm).

It is therefore believed that the suspension system 30 described herein remains largely unaffected (i.e. neither extends nor compresses) by the actuation of the rear brake. Indeed, the movement of the ICR 44 along its trajectory through infinity helps to achieve increased braking traction, while maintaining an active suspension that is unaffected by the actuation of the rear brake. The suspension system 30 can thus be described as one have a "neutral braking trajectory".

The shock 41 in the present suspension system 30 is placed low and central for better Center of Mass, and the ICR 44 trajectory through infinity enables increased braking traction to be achieved while still maintaining an active suspension that is unaffected by the actuation of the rear brake. Accordingly, the bicycle 20 described herein, unlike most other rear suspension bikes, does not "squat" under rear brake actuation as the suspension system 30 remains substantially unaffected (i.e. the suspension neither extends nor compresses with rear shock removed from chassis). With most prior art bikes, their rear wheel suspension systems squat due to rear brake actuation. This causes "braking bumps" to be created on the race track, in particular, into sharp corners that require hard braking before them (this is sometimes called the grip-slip phenomenon). Unlike these prior art configurations, the bicycle 20 having the suspension system 30 described herein may maintain greater traction with the ground as the suspension is allowed to undulate with the terrain (i.e. it is active) and applies a greater downwards force. In practical terms, this means that the brakes can be applied later, relative to most known prior art bicycles, as the bike will slow down more quickly (given than there is no braking energy absorbed or wasted by suspension squat).

Indeed, it is observed that the rotational inertia created by rear brake actuation is transferred to the suspension system 30 directly, and thus bypasses the rear wheel 29. As such, the wheels of the bicycle 20 described herein can maintain greater traction with the ground surface because the suspension system 30 is allowed to undulate with the terrain, and applies a greater downward force. Such functionality allows the brakes to be applied by the rider at a later point compared to some known rear wheel suspension bicycles, because the bicycle 20 will slow down more quickly.

There is also disclosed a method of making a bicycle 20, such as the one described above. More specifically, the bicycle 20 includes a rear wheel suspension system 30 which is pivotably attached to the main frame by upper and lower link members 31,38 and a shock absorber 41 mounted between the main frame and the upper link member. Each of the upper and lower link members 31,38 have a forward and a rearward pivot thereon. Each of the upper and lower link member 31,38 also respectively define an upper and lower link axis extending between each of the forward and rearward pivots.

The method includes designing the rear wheel suspension system 30 to have characteristics which remain throughout a travel distance of the shock absorber 41. Many characteristics are within the scope of the present disclosure. One characteristic which remains throughout the travel distance of the shock absorber 41 relates to the instantaneous center of rotation, or ICR 44. As explained above, the ICR is defined as a point at an intersection of the upper and lower link axes, and it displaces along a trajectory 60 as the shock absorber 41 operates between the extended configuration and the compressed configuration. More specifically, the ICR 44 displaces from behind the bottom bracket 26 as the shock absorber 41 begins to compress from the fully extended configuration, then displaces through the inflection point at which the upper axis and the lower axis are parallel, and then displaces in front of the bottom bracket 26 as the shock absorber 41 continues to compress to the fully compressed configuration.

In some embodiments, the characteristics of the design of the rear wheel suspension system 30 include displacing the ICR 44 away from the bottom bracket 26, and towards the bottom bracket 26, as the shock absorber 41 compresses between the extended configuration and the compressed configuration.

The method also includes assembling the rear wheel suspension system 30 by pivotably mounting the upper and lower link members 31,38 to the main frame 21 and the rear stay member 33 in a relative geometric relationship in order to provide these characteristics to the rear wheel suspension system 30.

It is known that some downhill mountain bicycles "squat" under rear brake actuation. This squatting resulting from rear brake actuation creates "braking bumps" on a race track, and in particular, on portions of the track which have sharp corners that require hard braking (the so-called "grip-slip" phenomenon). In contrast, the suspension system 30 described herein remains largely unaffected (i.e. neither extends nor compresses) by the actuation of the rear brake.

It can thus be appreciated that the suspension system 30 is allowed to operate more independently of the pedaling forces, thereby improving pedaling efficiency. Pedaling efficiency is therefore not sacrificed for rear wheel 29 travel, and the suspension system 30 reacts largely to ground forces only and suspension activation is minimized even while the rider is pedaling hard.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A bicycle, comprising:
   a main frame including at least a seat tube, a top tube, a head tube, a down tube, and a bottom bracket fixed to at least one of the seat tube and the down tube; and
   a rear wheel suspension system pivotably attached to the main frame, the rear wheel suspension system comprising:
   an upper link pivotably attached to the main frame at a first pivot point;
   a rear stay member having an upper end pivotably attached to the upper link at a second pivot point and a lower end having a dropout receiving a rear wheel axle of the bicycle;
   a lower link pivotably attached to the main frame at a third pivot point located on said main frame at a lower vertical elevation than the first pivot point, and the lower link being pivotably attached to the rear stay member at a fourth pivot point located on said rear stay member below said upper end thereof; and
   a shock absorber having a first end pivotably connected to the upper link and a second end pivotably connected to the main frame, the shock absorber operating between an uncompressed configuration and a fully compressed configuration;
   wherein an instantaneous center of rotation is defined at an intersection between an upper axis extending through the first and second pivots and a lower axis extending through the third and fourth pivots, the instantaneous center of rotation displacing along a trajectory as the shock absorber operates between the fully extended configuration and the fully compressed configuration; and wherein, as the shock absorber and thus the rear wheel suspension compresses from the fully extended configuration to the fully compressed configuration, the instantaneous center of rotation displaces from a first position located rearward of the bottom bracket to a second position located in front of the bottom bracket, and wherein the instantaneous center of rotation travels through an inflection point between the first and second positions, the inflection point corresponding to a position where the upper axis and the lower axis are parallel to each other and the instantaneous center of rotation is defined at infinity.

2. The bicycle according to claim 1, wherein before reaching the inflection point, the instantaneous center of rotation moves along the trajectory away from the bottom bracket as the shock absorber compresses, and remains rearward of the bottom bracket.

3. The bicycle according to claim 2, wherein after passing the inflection point, the instantaneous center of rotation moves along the trajectory toward the bottom bracket as the shock absorber compresses, while remaining forward of the bottom bracket.

4. The bicycle according to claim 1, wherein the instantaneous center of rotation is disposed behind the bottom bracket upon the shock absorber travelling between about 30% to about 40% of a travel distance of the shock absorber from the extended configuration.

5. The bicycle according to claim 1, wherein a suspension rate of the rear wheel suspension system decreases for a first portion of a travel distance of the shock absorber from the extended configuration.

6. The bicycle according to claim 5, wherein the suspension rate increases for a remaining portion of the travel distance after the first portion.

7. The bicycle according to claim 5, wherein the first portion is approximately 15% of the travel distance.

8. The bicycle according to claim 5, wherein the decrease of the suspension rate along the first portion corresponds to a displacement of the instantaneous center of rotation from behind the bottom bracket to the inflection point.

9. The bicycle according to claim 6, wherein the increase of the suspension rate along the remaining portion corresponds to a displacement of the instantaneous center of rotation from the inflection point to in front of the bottom bracket.

10. The bicycle according to claim 1, wherein the rear stay member rotates in a direction opposite to a direction of rotation of the rear wheel relative to the main frame.

11. A rear wheel suspension system pivotably attachable to a main frame of a bicycle, the main frame having at least a seat tube, a top tube, a head tube, a down tube, and a bottom bracket fixed to at least one of the seat tube and the down tube, the rear wheel suspension system comprising:
an upper link pivotably attachable to the main frame at a first pivot point;
a rear stay member having an upper end pivotably attachable to the upper link at a second pivot point and a lower end having a dropout receiving a rear wheel axle of the bicycle;
a lower link pivotably attachable to the main frame at a third pivot point located on said main frame at a lower vertical elevation than the first pivot point, and the lower link being pivotably attached to the rear stay member at a fourth pivot point located on said rear stay member below said upper end thereof; and
a shock absorber having a first end pivotably connected to the upper link and a second end pivotably connectable to the main frame, the shock absorber operating between an extended configuration and a compressed configuration;
wherein an instantaneous center of rotation is defined at an intersection between an upper axis extending through the first and second pivots and a lower axis extending through the third and fourth pivots, the instantaneous center of rotation displacing along a trajectory as the shock absorber operates between the extended configuration and the compressed configuration, and wherein as the shock absorber begins to compress from the extended configuration, the instantaneous center of rotation displaces from behind the bottom bracket, through an inflection point at which the upper axis and the lower axis are parallel, and to a location in front of the bottom bracket as the shock absorber continues to compress to the compressed configuration.

12. The rear wheel suspension system according to claim 11, wherein before reaching the inflection point, the instantaneous center of rotation moves along the trajectory away from the bottom bracket as the shock absorber compresses, and remains rearward of the bottom bracket.

13. The rear wheel suspension system according to claim 12, wherein after passing the inflection point, the instantaneous center of rotation moves along the trajectory toward the bottom bracket as the shock absorber compresses, while remaining forward of the bottom bracket.

14. The rear wheel suspension system according to claim 11, wherein the instantaneous center of rotation is disposed behind the bottom bracket upon the shock absorber travelling between about 30% to about 40% of a travel distance of the shock absorber from the extended configuration.

15. The rear wheel suspension system according to claim 11, wherein a suspension rate of the rear wheel suspension system decreases for a first portion of a travel distance of the shock absorber from the extended configuration.

16. The rear wheel suspension system according to claim 15, wherein the suspension rate increases for a remaining portion of the travel distance after the first portion.

17. The rear wheel suspension system according to claim 15, wherein the first portion is approximately 15% of the travel distance.

* * * * *